United States Patent [19]

Langendorf et al.

[11] Patent Number: 4,860,199
[45] Date of Patent: Aug. 22, 1989

[54] HASHING INDEXER FOR BRANCH CACHE

[75] Inventors: Brian K. Langendorf, Worcester; Robert F. Beckwith, Framingham, both of Mass.

[73] Assignee: Prime Computer, Inc., Natick, Mass.

[21] Appl. No.: 80,451

[22] Filed: Jul. 31, 1987

[51] Int. Cl.[4] .......................... G06F 9/36; G06F 9/42
[52] U.S. Cl. ................... 364/200; 364/243.4; 364/259; 364/259.8; 364/261.3; 364/261.7; 364/262.7; 364/262.8; 364/263.1
[58] Field of Search ... 364/200 MS File, 900 MS File

[56] References Cited

U.S. PATENT DOCUMENTS

| | | | |
|---|---|---|---|
| 3,325,785 | 6/1967 | Stevens | 364/200 |
| 3,559,183 | 1/1971 | Sussenguth | 364/200 |
| 4,370,711 | 1/1983 | Smith | 364/200 |
| 4,430,706 | 2/1984 | Sand | 364/200 |
| 4,464,713 | 8/1984 | Benhase et al. | 364/200 |
| 4,477,872 | 10/1984 | Losq et al. | 364/200 |
| 4,488,224 | 12/1984 | Ippolito et al. | 364/200 |

Primary Examiner—Eddie P. Chan
Assistant Examiner—Rebecca L. Rudolph
Attorney, Agent, or Firm—Wolf, Greenfield & Sacks

[57] ABSTRACT

A Hashing Indexer For a Branch Cache for use in a pipelined digital processor that employs macro-instructions utilizing interpretation by micro-instructions. Each of the macro-instructions has an associated address and each of the micro instructions has an associated address. The hashing indexer includes a look-ahead-fetch system including a branch cache memory coupled to the prefetch section. An indexed table of branch target addressess each of which correspond to the address of a previously fetched instruction is stored in the branch cache memory. A predetermined number of bits representing the address of the macro-instruction being fetched is hashed with a predetermined number of bits representing the address of the micro-instruction being invoked. The indexer is used to apply the hashing result as an address to the branch memory in order to read out a unique predicted branch target address that is predictive of a branch for the hashed macro-instruction bits and micro-instruction bits. The hashing indexer disperses branch cache entries throughout the branch cache memory. Therefore, by hashing macro-instruction bits with micro-instruction bits and by dispersing the branch cache entries throughout the branch cache memory, the prediction rate of the system is increased.

15 Claims, 4 Drawing Sheets

HASHING INDEXER FOR BRANCH CACHE

BACKGROUND OF THE INVENTION

The present invention relates to the field of digital computers and, in particular, to apparatus for processing instructions in high speed data processing systems.

A pipelined computer system divides computational tasks into a number of sequential subtasks. In such a pipelined computer system, each instruction is processed in part at each of a succession of hardware stages.

After the instruction has been processed at each of the stages, the execution is complete. In a pipelined configuration, as an instruction is passed from one stage to the next, that instruction is replaced by the next instruction in the program. Thus, the stages together form a "pipeline" which, at any given time, executes, in part, a succession of instructions. A pipelined computer system thus provides concurrent processing of a succession of instructions. Such instruction pipelines for processing a plurality of instructions in parallel are found in various computers.

When a pipelined system encounters a branch instruction, it is wasteful of computer resources to wait for execution of the instruction before proceeding with the next instruction fetch and execute. Therefore, pipelined systems commonly utilize branch prediction mechanisms to predict the outcome of branch instructions before the execution of the instruction, and such branch prediction mechanisms are used to guide prefetching of instructions.

Accordingly, it is a known advantage to provide a mechanism to predict a change in program flow as a result of a branch instruction. It is also known, however, that there is a time penalty for an incorrect prediction of program flow. This time loss occurs when instructions issue along the incorrect path selected by the branch prediction mechanism.

Therefore, an object of the invention is to provide an improved branch prediction apparatus with a high rate of correct predictions, so as to minimize the time loss resulting from incorrect predictions.

In the prior art, the reduction of branch penalty is attempted through the use of a branch cache interacting with the instruction prefetch stage. The branch cache utilizes the address of the instruction being prefetched to access a table. If a branch was previously taken at a given address, the table so indicates, and in addition, provides the target address of the branch on its previous execution. This target address is used to redirect instruction prefetching, based on the likelihood that the branch will repeat its past behavior. This approach offers the potential for eliminating delays associated with branches. Branch cache memory structures are utilized to permit predictions of non-sequential program flow following a branch instruction, prior to a determination that the instruction is capable of modifying program flow.

A system utilizing a branch cache does not require computation of the branch address before instruction prefetching can continue. Instead, the branch cache is used to make predictions based solely on previous instruction locations, thereby avoiding the wait for decoding of the current instruction before proceeding with prefetch of the next instruction. The branch address need not be calculated before prefetching can proceed, because target or branch addresses are stored in the branch cache. There are, however, delays due to incorrect prediction of branches.

Moreover, in a computer system which utilizes complex commands or "macro-instructions" requiring an interpretive instruction set or "micro-instruction" set, such as microcode, different types of macro-instructions will branch to different locations in microcode, and macro-instructions of the same type but at different addresses will branch to the same entry point into microcode. A micro-instruction branch's behavior depends on its address, and on the address of the macro-instruction that invoked the microcode routine.

Additionally, in some pipelined computer systems, the microcode processor itself is pipelined to improve performance, and both macro-instructions and micro-instructions are fetched by the same prefetch hardware. It is an object of the invention to provide a branch cache system adapted for a computer which utilizes both macro-instructions and micro-instructions, in which the microcode engine is pipelined and in which both macro-instructions and micro-instructions are fetched by the same hardware.

It is another object of the invention to provide a branch cache system which improves the ability of the branch cache to correctly predict the results of micro-instruction branches.

SUMMARY OF THE INVENTION

The invention achieves the above objects by providing a lookahead fetch system for transmitting predicted branch addresses to a prefetch unit prior to decoding of a respective branch instruction. The lookahead fetch system includes a branch cache in communication with the prefetch section. The branch cache includes a plurality of indexed memory locations for storing an indexed table of branch addresses. Each branch address corresponds to a previously fetched macro-instruction and is predictive of a branch resulting from a succeeding execution of that macro-instruction.

The invention also includes a hashing element for combining a predetermined number of bits representative of the address of a macro-instruction being interpreted with a predetermined number of bits representative of the address of a micro-instruction invoked by the macro-instruction. The invention further includes an index element, in communication with the hashing element and the branch cache, for indexing, into memory locations in said branch cache means, branch addresses corresponding to fetched macro-instructions and micro-instructions, responsive to combinations of bits produced by the hashing element.

Each branch cache location associated with an instruction invoking micro-instructions has a bit field associated therewith indicative not only of the address of the micro-instruction being invoked, but also indicative of the address of the macro-instruction which invoked that micro-instruction.

This hashing index scheme results in a scattering of branch cache entries. More importantly, the scattering of branch cache entries increases the prediction rate of a branch cache because separate predictions for each invocation of micro-instructions will be stored at different branch cache locations, thus increasing the probability of finding a prediction in branch cache for a given invocation of a micro-instruction.

The invention will next be described in connection with certain illustrated embodiments. However, it should be clear that various changes, modifications and additions can be made by those skilled in the art without departing from the scope of the invention as defined in the claims.

BRIEF DESCRIPTION OF DRAWINGS

For a fuller understanding and objects of the invention, reference should be made to the following detailed description and the accompanying drawings in which.

DESCRIPTION OF ILLUSTRATED EMBODIMENTS

Figure 1:
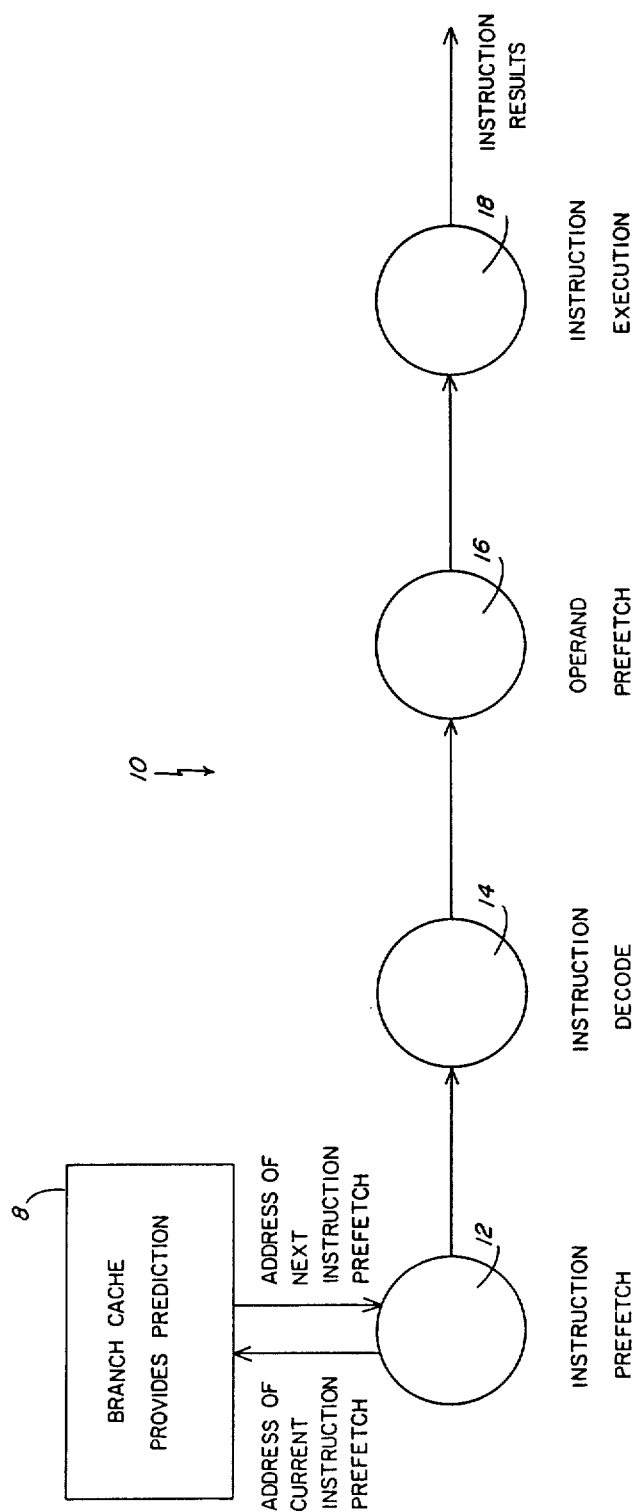
FIG. 1 is a functional block diagram of a pipelined processor according to the prior art.

FIG. 1 is a block diagram of a pipelined computer system 10 employing a branch cache 8. Instruction prefetch section 12 fetches instructions out of a memory unit and transmits the instructions to instruction decode section 14. After the instruction is decoded in decode section 14, the instruction is passed to operand prefetch section 16. Operand section 16 fetches operands out of a memory unit and passes both the decoded instruction and the operand to instruction execution stage 18, which, in turn, generates instruction results. Branch cache 8 is in communication with instruction prefetch section 12. Branch cache 8 receives from instruction prefetch section 12 the address of a current instruction prefetch. Branch cache 8 provides, as known in the art, the predicted address of a next instruction prefetch.

Figure 2:
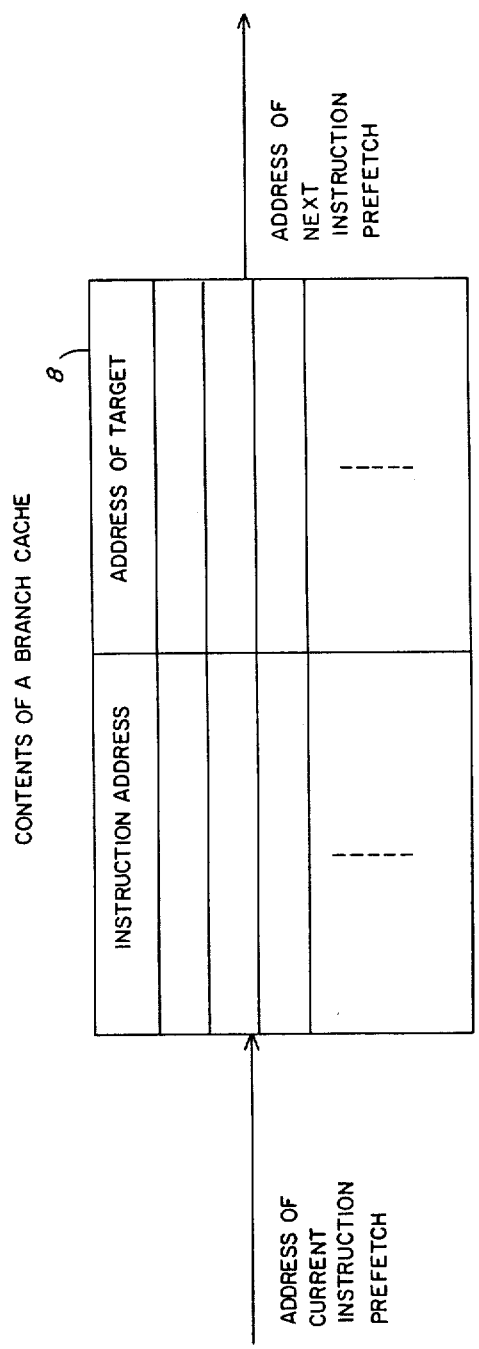
FIG. 2 is a block diagram of the contents of a prior art branch cache.

The contents of a prior art branch cache 8 are illustrated in FIG. 2. Branch cache 8 receives as input the address of the current instruction prefetch, and this address is used to index a table. The table stores target branch addresses previously encountered for each fetched instruction. Branch cache 8 then transmits the predicted address of a next instruction prefetch.

Figure 3:
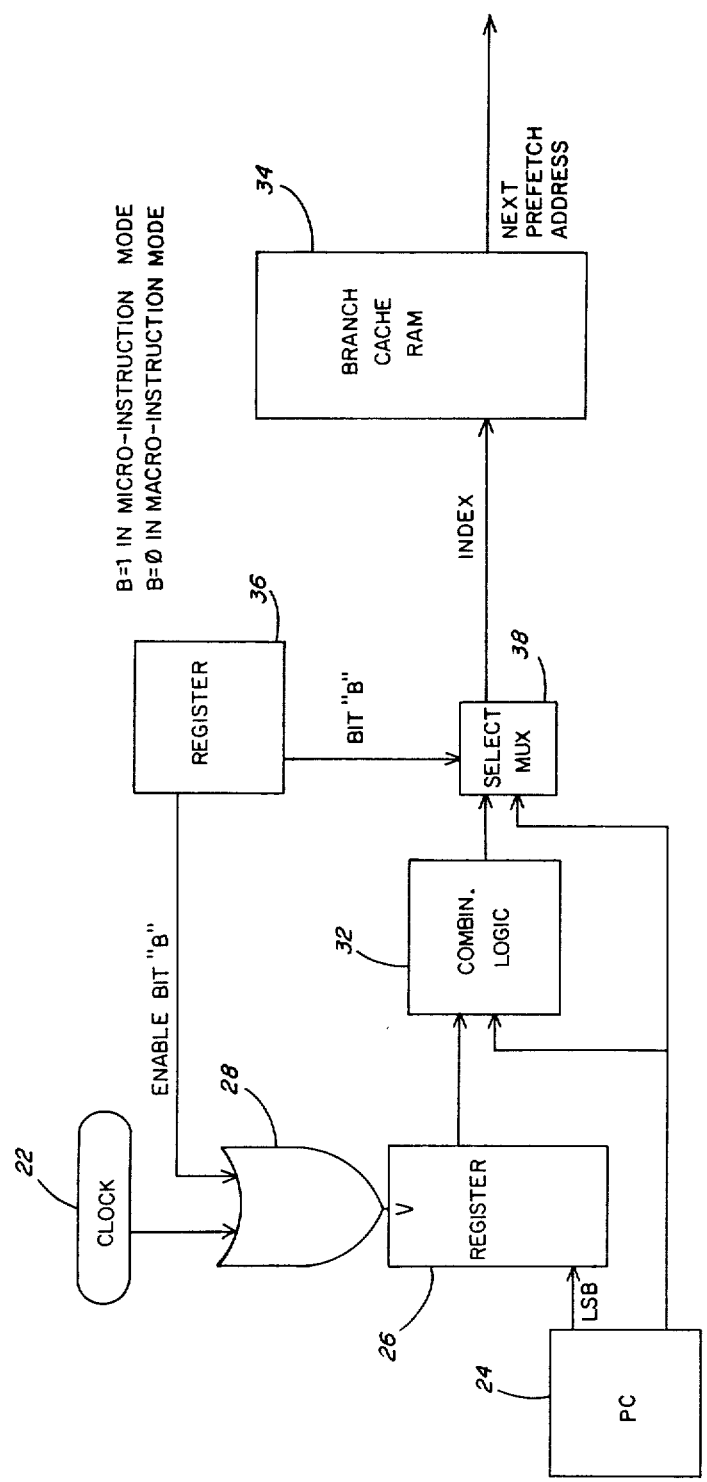
FIG. 3 is a functional block diagram of a branch cache indexer according to the invention.

FIG. 3 is a functional block diagram of a branch cache indexer 30 according to the invention. The invention is advantageously practiced in a pipelined computer system in which a microcode processor is itself pipelined to improve performance, and in which both macro-instructions and micro-instructions are fetched by the same prefetch hardware. To provide scattering within the branch cache RAM 34, the invention uses a register 26, which is loaded with the least significant bits (LSBs) of the Program Counter (PC) 24 each time a macro-instruction is executed. When an invocation of a micro-instruction is encountered, the contents of the register 26 are frozen, in a manner more fully described hereinafter. The register 26 then contains the LSBs of the address of the macro-instruction which caused an invocation of the micro-instruction routine. The LSBs from register 26 and the LSBs of the PC 24, which are then pointing to a micro-instruction address, are combined by combinational login gate 32, which in one embodiment of the invention includes exclusive-or (XOR) gates known in the art.

The output of combinational logic gate 32 is then used as an index to address a branch cache 34. Branch cache 34 is preferably implemented in a random access memory (RAM) which contains a plurality of indexed memory locations for storing branch addresses associated with previously fetched branch instructions. Such branch addresses are predictive of changes in program flow caused by a succeeding execution of corresponding branch instructions. The output of branch cache 34 is thus used as the next prefetch address to be utilized by instruction prefetch section 12.

As an example of the operation of the above-described structure, if three micro-instruction CALLs to the same micro-instruction address are present at three different addresses in the macro-instruction code, there will be three different sets of LSBs in register 26. The contents of register 26 will be combined by combinational logic gate 32 with the address of the micro-instruction branch, to produce three different indexes to address the branch cache RAM 34. The result is scattering of micro-instruction branch entries within the branch cache RAM 34, and an identification of each invocation of the micro-instruction routine.

The combined, or hashed, LSBs transmitted by combinational logic gate 32 are used to address RAM 34 to indicate which location in RAM 34 is to contain a branch address entry corresponding to the fetched instruction. The hashed bits transmitted by combinational logic gate 32 thus provide an indication of the instruction address which caused a particular branch to the micro-instruction set. The branch cache entries for each invocation of a macro-instruction are accordingly identified for each specific instance of that macro-instruction.

As discussed above in connection with the embodiment of FIG. 3, when an invocation of the micro-instruction set is encountered by the pre-fetch section, the contents of register 26 are frozen. In order to accomplish this result, when the branch cache 34 predicts an entry into the micro-instruction set, an enable bit "B", which may be stored in a one-bit register exemplified by register 36, is set to logic ONE. Bit "B" is otherwise set to logic ZERO, as during fetching of macro-instructions. Setting the enable bit "B" of register 36 to logic ONE causes the output of OR gate 28 to freeze at logic ONE regardless of the output state of clock 22, thereby effectively freezing the clock input to register 26.

Simultaneously, path selection logic 38, responsive to the logic ONE value of the enable bit, switches circuit paths so that the index to branch cache RAM 34 is taken from the hashed bits transmitted by logic gate 32. Thus, when an entry into the micro-instruction set is predicted, the hashed output bits of logic gate 32 are used as an index to address branch cache RAM 34.

Figure 4:
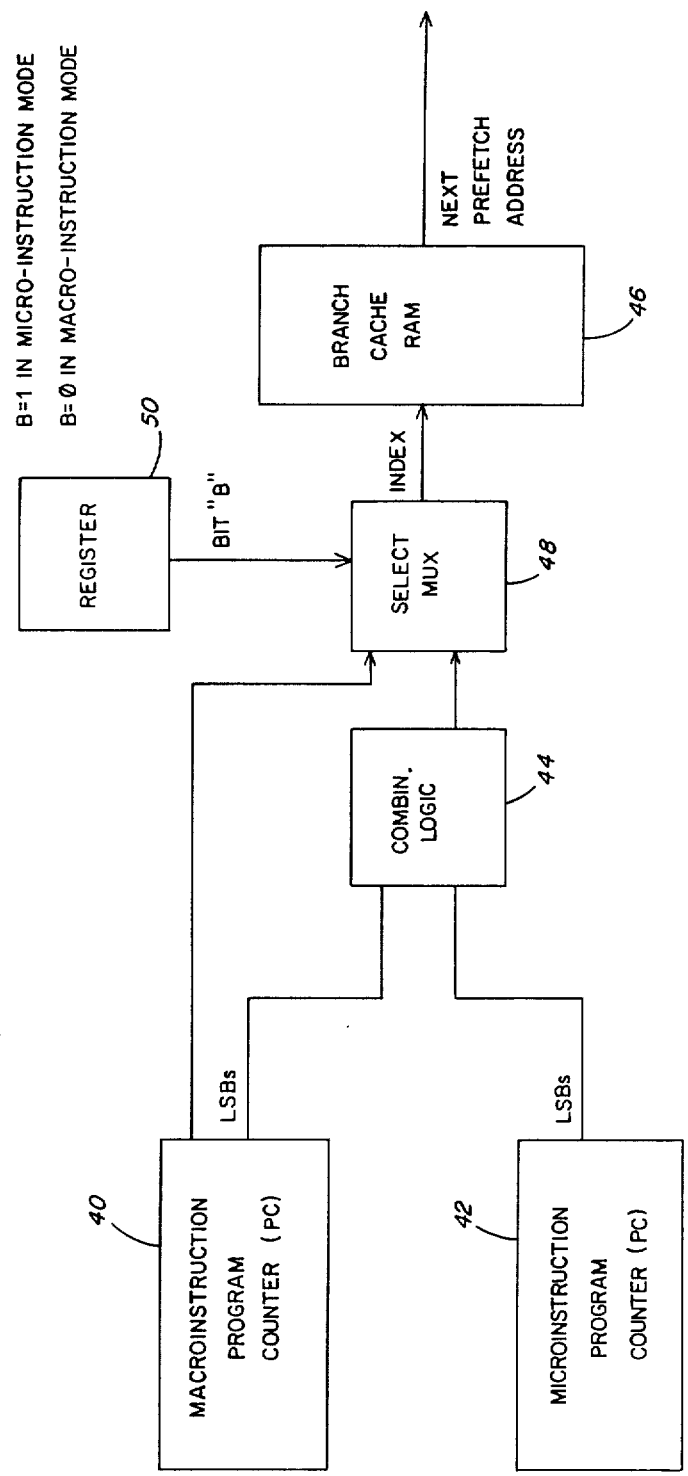
FIG. 4 is a functional block diagram of another embodiment of a branch cache indexer according to the invention.

In another embodiment of the invention, illustrated in FIG. 4, separate macro-instruction and micro-instruction program counters are employed, and a register is not utilized. In such an embodiment, LSBs from macro-instruction program counter 40 and micro-instruction program counter 42 are combined in a combinational logic module 44, which, in one embodiment of the invention, is provided by XOR gates. The output of logic gate 44 is used to address branch cache RAM 46 in a manner similar to that described above in connection with the embodiment of FIG. 3.

In particular, path selection logic (select multiplexor) 48 selectively switches circuit paths so that the index to branch cache RAM 46 is taken either from the hashed bits transmitted by combinational logic 44, or from the bits transmitted by macro-instruction PC 40. Multiplexor (MUX) 48 makes this selection in response to the digital bit "B" value stored in register 50.

When the branch cache 46 predicts an entry into the micro-instruction set, the enable bit "B" is set to logic ONE. Bit "B" is otherwise set to logic ZERO, as during fetching of macro-instructions. MUX 48, responsive to a logic ONE value of the enable bit "B", switches circuit paths so that the index to branch cache RAM 46 is taken from the hashed bits transmitted by combinational logic 44. Thus, when entry into the micro-instruction set is predicted, the hashed output bits of combinational logic 44 are used as an index to address branch cache RAM 34.

This indexing scheme results in a scattering of micro-instruction branch cache entries for each invocation of a particular macro-instruction. Such scattering of micro-instruction branch cache entries increases the prediction rate of a branch cache because separate predictions for each invocation of a branch micro-instruction will be stored at different branch cache locations. The probability of finding a prediction in branch cache for a given branch instruction is thereby increased.

The invention can also be practiced in a system employing a multiple set branch cache, as described in related U.S. patent application Ser. No. 07/080,457, filed on even date, entitled "Multiple Set Branch Cache," the specification of which is incorporated herein.

It will thus be seen that the invention efficiently attains the objects set forth above. It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all the generic and specific features of the invention as described herein, and all statements of the scope of the invention which, as a matter of language, might be said to fall therebetween. Having described the invention, what is claimed as new and secured by letters patent is:

1. In a pipelined digital processor employing macro-instructions utilizing interpretation by micro-instructions, each of said macro-instructions being identifiable by an assoicated address and each of said micro-instructions being identifiable by an associated addresss, a lookahead fetch system for transmitting predicted brach addresses to a prefetch section prior to decoding of respective brach instructions, comprising:

branch cache means coupled to said prefetch section, said branch cache means receiving prefetch information from said prefetch section, and said branch cache means transmitting to said prefetch section predicted branch address information, said branch cache means including a plurality of indexed memory loations for storing an indexed table of branch target addresses, each of said branch target addresses corresponding to an addresss of a previously fetched instruction that resulted from a succeeding execution of said instruction, hashing means for simultaniously receiving and combining a predetermined number of bits representative of the address of a macro-instruction being fetched with a predetermined number of bits representative of the address of a micro-instruction invoked by said macro-instruction, and index means, in communication with said hashing means and said branch cache means, for applying an address, generated by combinations of bits produced by said hashing means, to said branch cache means, to read out a branch target address;

whereby a branch target address that is predictive of a branch of a micro-instruction interpreting a macro-instruction is read out of the branch cache means.

2. A system according to claim 1, wherein said branch cache means includes a Random Access Memory having a plurality of memory locations.

3. A system according to claim 1,
wherein said predetermined number of bits representative of the address of a macro-instruction being fetched includes the least significant bits of the address of said macro-instruction, and
wherein said predetermined number of bits representative of the address of a micro-instruction being invoked includes the least significant bits of the address of said micro-instruction.

4. A system according to claim 2,
wherein said predetermined number of bits representative of the address of a macro-instruction being fetched includes the least significant bits of the address of said macro-instruction, and
wherein said predetermined number of bits representative of the address of a micro-instruction being invoked includes the least significant bits of the address of said micro-instruction.

5. A system according to claim 1, wherein said hashing means includes combinatorial logic gate means for performing a combinatorial logic operation on said bits representative of the address of said macro-instruction and said bits representative of the address of said micro-instruction.

6. A system according to claim 2, wherein said hashing means includes combinatorial logic gate means for performing a combinatorial logic operation on said bits representative of the address of said macro-instruction and said bits representative of the address of said micro-instruction.

7. A system according to claim 3, wherein said hashing means includes combinatorial logic gate means for performing a combinatorial logic operation on said bits representative of the address of said macro-instruction and said bits representative of the address of said micro-instruction.

8. A system according to claim 4, wherein said hashing means includes combinatorial logic gate means for performing a combinatorial logic operation on said bits representative of the address of said macro-instruction and said bits representative of the address of said micro-instruction.

9. A system according to claim 5, wherein said combinatorial logic gate means includes exclusive-or (XOR) gate means for performing an XOR operation on said bits representative of the address of said macro-instruction and said bits representative of the address of said micro-instruction.

10. A system according to claim 6, wherein said combinatorial logic gate means includes exclusive-or (XOR) gate means for performing an XOR operation on said bits representative of the address of said macro-instruction and said bits representative of the address of said micro-instruction.

11. A system according to claim 7, wherein said combinatorial logic gate means includes exclusive-or (XOR)

gate means for performing an XOR operation on said bits representative of the address of said macro-instruction and said bits representative of the address of said micro-instruction.

12. A system according to claim 8, wherein said combinatorial logic gate means includes exclusive-or (XOR) gate means for performing an XOR operation on said bits representative of the address of said macro-instruction and said bits representative of the address of said micro-instruction.

13. A method for predicting branch target addresses for a pipelined digital processing system having a branch cache which holds the branch target addresses comprising the steps of:
   (a) executing a sequence of macro-instructions, each of which invokes the execution of a sequence of micro-instructions;
   (b) determining when a micro-instruction of the sequence of micro-instructions indicates a branch is to occur;
   (c) hashing a predetermined number of bits of the address of the micro-instruction indicating the occurrence of a branch with a predetermined number of bits of the address of the macro-instruction that invoked the micro-insturciton; and
   (d) using the hashing result to address the branch cache and read out a branch target address.

14. A method according to claim 13 further comprising the steps of:
   (a) creating a correspondence between a memory location and the branch target address; and
   (b) storing the branch target address at the memory location.

15. A method according to claim 14 further comprising the steps of:
   (a) using the hashing result to access the memory location; and
   (b) obtaining the branch target address from the accessed memory location.

* * * * *